US009609069B2

(12) United States Patent
Alexandrescu et al.

(10) Patent No.: US 9,609,069 B2
(45) Date of Patent: Mar. 28, 2017

(54) ADMINISTERING A REMOTE SESSION BETWEEN A TARGET COMPUTING DEVICE AND A REMOTE COMPUTING DEVICE

(71) Applicant: LENOVO ENTERPRISE SOLUTIONS (SINGAPORE) PTE. LTD., Singapore (SG)

(72) Inventors: Nicolae-Marian Alexandrescu, Bucharest (RO); Gregory W. Dake, Durham, NC (US); Mark E. Molander, Cary, NC (US); Michael H. Nolterieke, Raleigh, NC (US); Paul K. Scrutton, Durham, NC (US); John K. Whetzel, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 14/570,403

(22) Filed: Dec. 15, 2014

(65) Prior Publication Data
US 2016/0173614 A1 Jun. 16, 2016

(51) Int. Cl.
*G06F 15/16* (2006.01)
*H04L 29/08* (2006.01)
(Continued)

(52) U.S. Cl.
CPC ............ *H04L 67/146* (2013.01); *G06F 17/30* (2013.01); *H04L 29/08072* (2013.01);
(Continued)

(58) Field of Classification Search
CPC .......................................................... H04L 29/06
(Continued)

(56) References Cited

U.S. PATENT DOCUMENTS

| 6,473,794 B1 * | 10/2002 | Guheen | H04L 41/22 709/223 |
| 6,519,571 B1 * | 2/2003 | Guheen | G06Q 30/02 705/14.66 |

(Continued)

OTHER PUBLICATIONS

LNS Software, "Allowing Remote Control Without Showing an "Allow Access" Prompt", Steve's Blog, LNSSoftware.ca (online publication), Oct. 2011, 1 page, LNS Software Systems, Ontario, Canada, URL: http://www.lnssoftware.ca/blog/?p=138.

(Continued)

*Primary Examiner* — Khanh Dinh
(74) *Attorney, Agent, or Firm* — Brandon C. Kennedy; Douglas W. Robinson; Kennedy Lenart Spraggins LLP

(57) ABSTRACT

Administering a remote session between a target computing device and a remote computing device, including: identifying, by a remote session administration module, a confidentiality level of content displayed by a target computing device, the target computing device engaged in a remote session with remote computing device, the remote session carried out by software executed by the target computing device, software executed by the remote computing device, and an active data communication link between the target computing device and the remote computing device; and controlling, by the remote session administration module, the remote session in dependence upon the confidentiality level of content displayed by the target computing device.

18 Claims, 6 Drawing Sheets

(51) Int. Cl.
*G06F 17/30* (2006.01)
*H04L 29/06* (2006.01)

(52) U.S. Cl.
CPC ............ *H04L 63/10* (2013.01); *H04L 67/025* (2013.01); *H04L 67/14* (2013.01); *H04L 67/141* (2013.01); *H04L 67/142* (2013.01); *H04L 67/143* (2013.01)

(58) Field of Classification Search
USPC .............................. 709/203, 220, 224, 227
See application file for complete search history.

(56) References Cited

U.S. PATENT DOCUMENTS

| | | | |
|---|---|---|---|
| 6,687,859 B2 | 2/2004 | Robsman et al. | |
| 7,315,826 B1* | 1/2008 | Guheen | G06F 17/3089 703/27 |
| 7,430,597 B2 | 9/2008 | Kuwata et al. | |
| 7,441,265 B2* | 10/2008 | Staamann | G06F 9/465 709/229 |
| 7,676,675 B2 | 3/2010 | Billharz et al. | |
| 7,916,926 B2 | 3/2011 | Naya et al. | |
| 8,321,685 B2 | 11/2012 | Bowers | |
| 8,326,999 B2 | 12/2012 | Fell, Jr. et al. | |
| 8,935,654 B2* | 1/2015 | Sengupta | G06F 17/2705 700/91 |
| 8,955,038 B2* | 2/2015 | Nicodemus | G06F 21/55 717/172 |
| 9,262,404 B2* | 2/2016 | Ingram | G06F 11/3684 |
| 2003/0088677 A1 | 5/2003 | Yamamoto | |
| 2011/0153716 A1 | 6/2011 | Malakapalli et al. | |
| 2012/0137217 A1 | 5/2012 | Amsterdam et al. | |
| 2012/0185621 A1 | 7/2012 | Goodley, II et al. | |
| 2012/0278726 A1 | 11/2012 | Halperin et al. | |
| 2013/0185056 A1* | 7/2013 | Ingram | G06F 11/3684 704/9 |
| 2013/0254833 A1* | 9/2013 | Nicodemus | G06F 21/55 726/1 |

OTHER PUBLICATIONS

Fike, "FSM-8 Processing Unit", Video Smoke Detection and Video Flame Detection Systems from Fike, fike.com (online publication), Aug. 2011, 1 page, Fike Corporation, USA, URL: http://www.fike.com/products/fdfsm8.html.

\* cited by examiner

ADMINISTERING A REMOTE SESSION BETWEEN A TARGET COMPUTING DEVICE AND A REMOTE COMPUTING DEVICE

BACKGROUND OF THE INVENTION

Field of the Invention

The field of the invention is data processing, or, more specifically, methods, apparatus, and products for administering a remote session between a target computing device and a remote computing device.

Description of Related Art

Modern computing devices may be capable of communicating with each other as the computing devices may be connected by, and even included as a part of, one or more data communications networks. In some instances, the computing devices may include remote desktop software that enables a user that is physically located at a first computing device to control the operation of a remotely located second computing device. An unintended consequence of controlling the operation of the remotely located second computing device first may arise, however, when the remotely located second computing device is displaying confidential information. In such instances, users that have access to the remotely located second computing device may be unintentionally able to view the confidential information.

SUMMARY OF THE INVENTION

Methods, apparatuses, and products for administering a remote session between a target computing device and a remote computing device, including: identifying, by a remote session administration module, a confidentiality level of content displayed by a target computing device, the target computing device engaged in a remote session, wherein the remote session comprises software executed by the target computing device and an active data communication link between the target computing device and the remote computing device; and controlling, by the remote session administration module, the remote session in dependence upon the confidentiality level of content displayed by the target computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
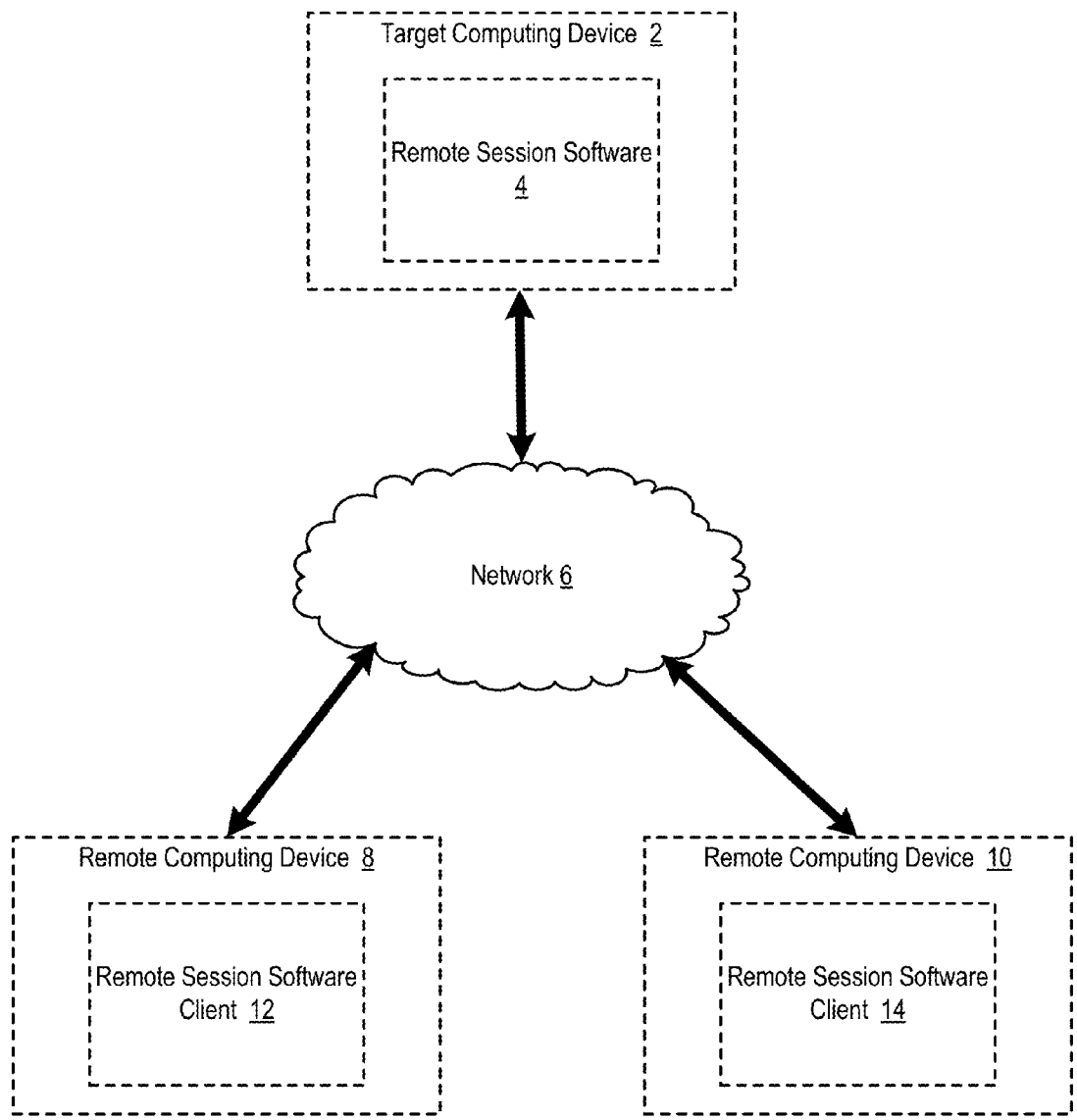
FIG. 1 sets forth a network diagram of a system in which a remote session may be initiated between a target computing device and a remote computing device according to embodiments of the present invention.

Example methods, apparatuses, and products for administering a remote session between a target computing device and a remote computing device in accordance with the present invention are described with reference to the accompanying drawings, beginning with FIG. 1. FIG. 1 sets forth a network diagram of a system in which a remote session may be initiated between a target computing device (2) and a remote computing device (8, 10) according to embodiments of the present invention.

The system of FIG. 1 includes a target computing device (2) and two remote computing devices (8, 10) that are coupled for data communications via a data communications network (6). Such a data communications network (6) may be embodied, for example, as a computer network where networked computing devices exchange data with each other along data connections. Data may be exchanged through the use of data packets that are passed along data connections that are established, for example, using cable media, wireless media, or any combination thereof.

In the example depicted in FIG. 1, the target computing device (2) is characterized as being a 'target' in the sense that one or more of the remote computing devices (8, 10) may attempt to control the operation of the target computing device (2) via a remote session. A remote session between the target computing device (2) and a particular remote compute device (8, 10) is created when remote session software (4) executing on the target computing device (2) enables the target computing device (2) to be controlled by a particular remote computing device (8, 10). Such remote session software (4) may be embodied, for example, as a standalone software application or as part of an operating system feature that enables to the target computing device (2) to be controlled remotely. A particular remote computing device (8, 10) may control the target computing device (2), for example, through the use of remote session software client (12, 14) executing on the remote computing device (8, 10). In such a way, a user can control the operation of the target computing device (2) even when the user is physically utilizing the remote computing device (8, 10). The user may therefore administer the target computing device (2) by performing system administration tasks on the target computing device (2), the user may utilize software that is installed on the target computing device (2), or the user may otherwise utilize the target computing device (2) in spite of the fact that the user is not physically close to the target computing device (2).

The arrangement of servers and other devices making up the example system illustrated in FIG. 1 are for explanation, not for limitation. Systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Administering remote sessions between a target computing device and a remote computing device in accordance with the present invention is generally implemented with computers, that is, with automated computing machinery. For further explanation, therefore, FIG. 2 sets forth a block diagram of automated computing machinery comprising an example computer (152) useful in administering remote sessions between a target computing device and a remote computing device according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a remote session administration module (126), a module of computer program instructions for administering remote sessions between a target computing device (192) and a remote computing device (194) according to embodiments of the present invention. A remote session between a target computing device (192) and a remote compute device (194) is created when remote session software executing on the target computing device (192) enables the target computing device (192) to be controlled by a remote computing device (194). Such remote session software may be embodied, for example, as a standalone software application or as part of an operating system feature that enables the target computing device (192) to be controlled remotely. The remote computing device (194) may control the target computing device (192), for example, through the use of a remote session software client executing on the remote computing device (194). In such a way, a user can control the operation of the target computing device (192) even when the user is physically utilizing the remote computing device (194). The user may administer the target computing device (192) by performing system administration tasks on the target computing device (192), the user may utilize software that is installed on the target computing device (192), or the user may otherwise utilize the target computing device (192) in spite of the fact that the user is not physically close to the target computing device (192).

Figure 2:
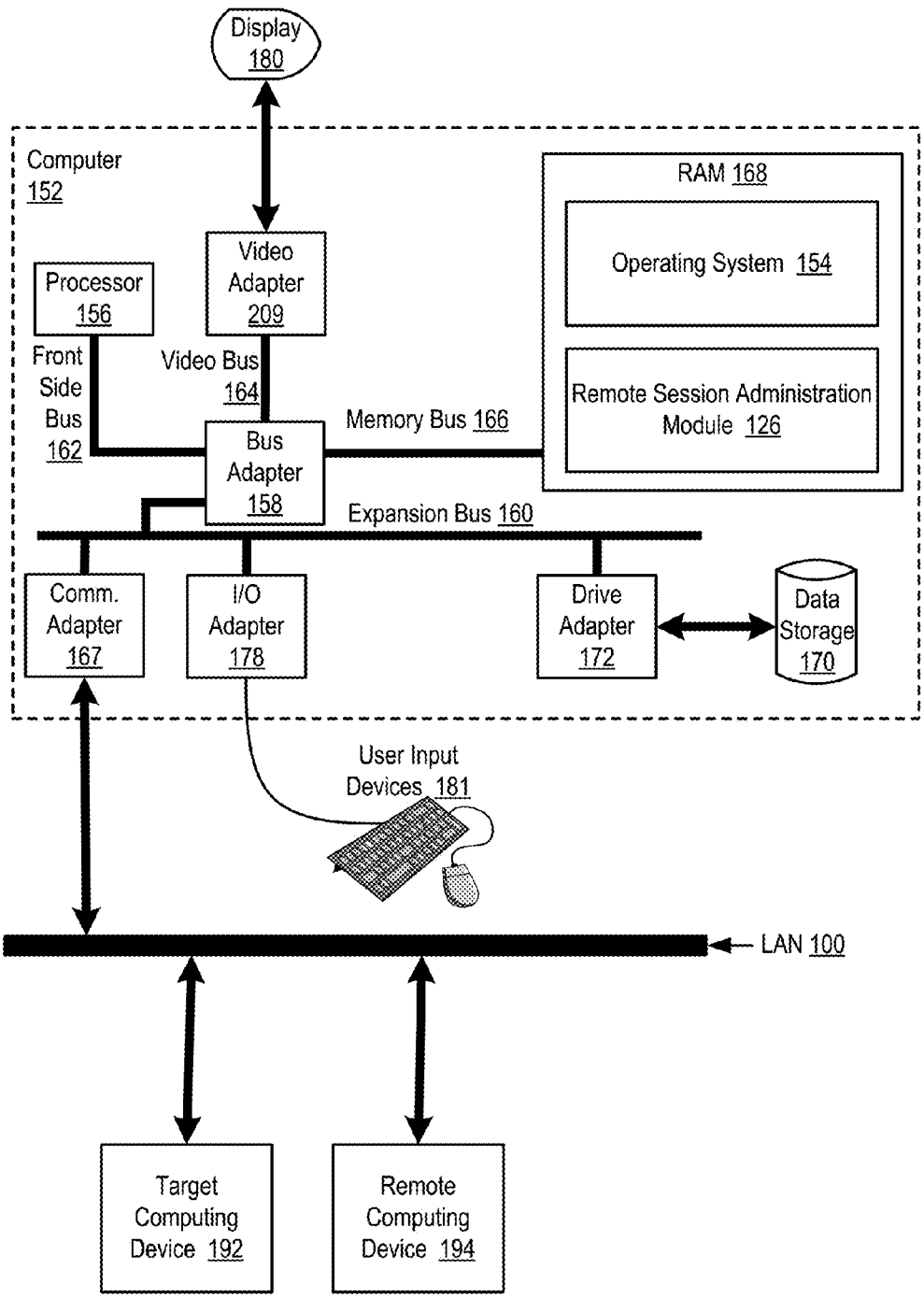
FIG. 2 sets forth a block diagram of automated computing machinery comprising an example computer useful in administering remote sessions between a target computing device and a remote computing device according to embodiments of the present invention.

The remote session administration module (126) depicted in FIG. 2 may be configured to administer remote sessions between a target computing device (192) and a remote computing device (194) according to embodiments of the present invention by identifying a confidentiality level of content displayed by the target computing device (192) that is engaged in a remote session with the remote computing device (194) via an active data communication link between the target computing device (192) and the remote computing device (194). The content displayed by the target computing device (192) may include, for example, web content displayed via a web browser, documents displayed via a word processing application, spreadsheets displayed via a spreadsheet application, and so on. Such content may be 'displayed' by the target computing device (192) in the sense that the target computing device (192) generates data that may be utilized by a computer display (e.g., a computer monitor) that is operatively coupled to the target computing device (192) to generate graphical data for presentation to a user of the target computing device (192). Alternatively, such content may be 'displayed' by the target computing device (192) in the sense that the target computing device (192) generates data that is transferred to the remote computing device (194) and may be utilized by the remote computing device (194) to generate graphical data for presentation to a user of the remote computing device (192) via a computer display that is operatively coupled to the remote computing device (192).

The confidentiality level of content displayed by the target computing device (192) represents the extent to which access to the content should be restricted. Access to such content should be restricted, for example, because the content includes private financial information, because the content includes proprietary information for a business entity, and so on. The confidentiality level of content displayed by the target computing device (192) may be expressed in relative terms (e.g., highly confidential, moderately confidential, not confidential) or in absolute terms such as an integer value where a value of 10 represents highly confidential information and a value of 0 represents information that is not confidential at all.

Identifying a confidentiality level of content displayed by the target computing device (192) that is engaged in a remote session with the remote computing device (194) may be carried out, for example, by searching the content for keywords that indicate that the content is intended to be confidential. For example, content that includes the term "confidential" may be identified as being highly confidential. Likewise, content that is displayed in a web browser whose web address begins in "https" may be identified as being highly confidential by virtue of the fact that the content is being displayed via a secure connection. Readers will appreciate that other characters and keywords such as "$," "top secret," "proprietary," and may others may also be indicative of confidential information. In such an example, the frequency that certain keywords appear in the content may be utilized to identify a confidentiality level of content displayed by the target computing device (192) that is engaged in a remote session with the remote computing device (194).

Readers will appreciate that identifying a confidentiality level of content displayed by a target computing device (192) that is engaged in a remote session with the remote computing device (194) may be carried out in a variety of additional ways. For example, content that is accessed by providing a username and password may be identified as being more confidential than content that can be accessed without providing information to authenticate the user. Likewise, content that is generated by some software applications (e.g., tax preparation software) may be identified as being more confidential that content that is generated by other software applications (e.g., graphics painting software).

The remote session administration module (126) depicted in FIG. 2 may be further configured to administer remote sessions between a target computing device (192) and a remote computing device (194) according to embodiments of the present invention by controlling the remote session in dependence upon the confidentiality level of content displayed by the target computing device (192) that is engaged in a remote session with the remote computing device (194). Controlling the remote session in dependence upon the confidentiality level of content displayed by the target computing device (192) may be carried out, for example, by limiting the amount of time that a remote session can remain open when a user of the remote computing device (194) is not utilizing the remote session. For example, when highly confidential content is being displayed by the target computing device (192) but a user of the remote computing device (194) is not actively utilizing the remote session, the remote session may be terminated almost immediately. When content that is not confidential is being displayed by the target computing device (192), however, the remote session may remain open indefinitely even if the user of the remote computing device (194) is not actively utilizing the remote session.

Consider an example in which the user of the remote computing device (194) initiates a remote session with the target computing device (192). In such an example, assume that the user of the remote computing device (194) accesses highly confidential information on the target computing device (192) via the remote session. In such an example, if it is determined that the user of the remote computing device (194) has not utilized the remote session for a predetermined period of time (e.g., the user has stepped away from the remote computing device), the remote session may be terminated such that another unauthorized user is not able to access the confidential information by simply walking by the remote computing device (194) and viewing an attached monitor or display, which may be displaying the confidential content. In an example where the user of the remote computing device (194) is not accessing confidential information on the target computing device (192), however, the remote session may remain active even if the user of the remote computing device (194) has not utilized the remote session for the same predetermined period of time, as the unauthorized user is only able to access non-confidential information by simply walking by the remote computing device (194) and viewing an attached monitor or display, which may be displaying the non-confidential content.

Readers will appreciate that the remote session administration module (126) may control the remote session in dependence upon the confidentiality level of content displayed by the target computing device (192) in other ways. For example, the remote session administration module (126) may restrict the manner in which other users access the target computing device (192) in dependence upon the confidentiality level of content displayed by the target computing device (192). The remote session administration module (126) may also perform certain functions (e.g., closing out of a software application on the target computing device, restarting the target computing device) when a remote session is terminated in dependence upon the confidentiality level of content displayed by the target computing device (192) that is engaged in a remote session with the remote computing device (194).

Also stored in RAM (168) is an operating system (154). Operating systems useful administering remote sessions between a target computing device (192) and a remote computing device (194) according to embodiments of the present invention include UNIX™, Linux™, Microsoft XP™, AIX™, IBM's i5/OS™, and others as will occur to those of skill in the art. The operating system (154) and the remote session administration module (126) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for administering remote sessions between a target computing device (192) and a remote computing device (194) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for administering remote sessions between a target computing device (192) and a remote computing device (194) according to embodiments of the present invention include modems for wired dial-up communications, Ethernet (IEEE 802.3) adapters for wired data communications network communications, and 802.11 adapters for wireless data communications network communications.

The example depicted in FIG. 2 illustrates an embodiment where the remote session administration module (126) resides on a computer (152) that is separate from the target computing device (192) and the remote computing device (194). Readers will appreciate that in alternative embodiments, the remote session administration module (126) may reside on the target computing device (192) itself. In such an example, the target computing device (192) may include the necessary computer hardware to support the remote session administration module (126), such as a computer memory, a computer processor, and so on. In such an alternative embodiment, the target computing device (192) may therefore be configured to administer remote sessions between itself and a remote computing device according to embodiments of the present invention by identifying a confidentiality level of content displayed by the target computing device (192) and controlling the remote session in dependence upon the confidentiality level of content displayed by the target computing device (192), as described throughout this specification.

Figure 3:
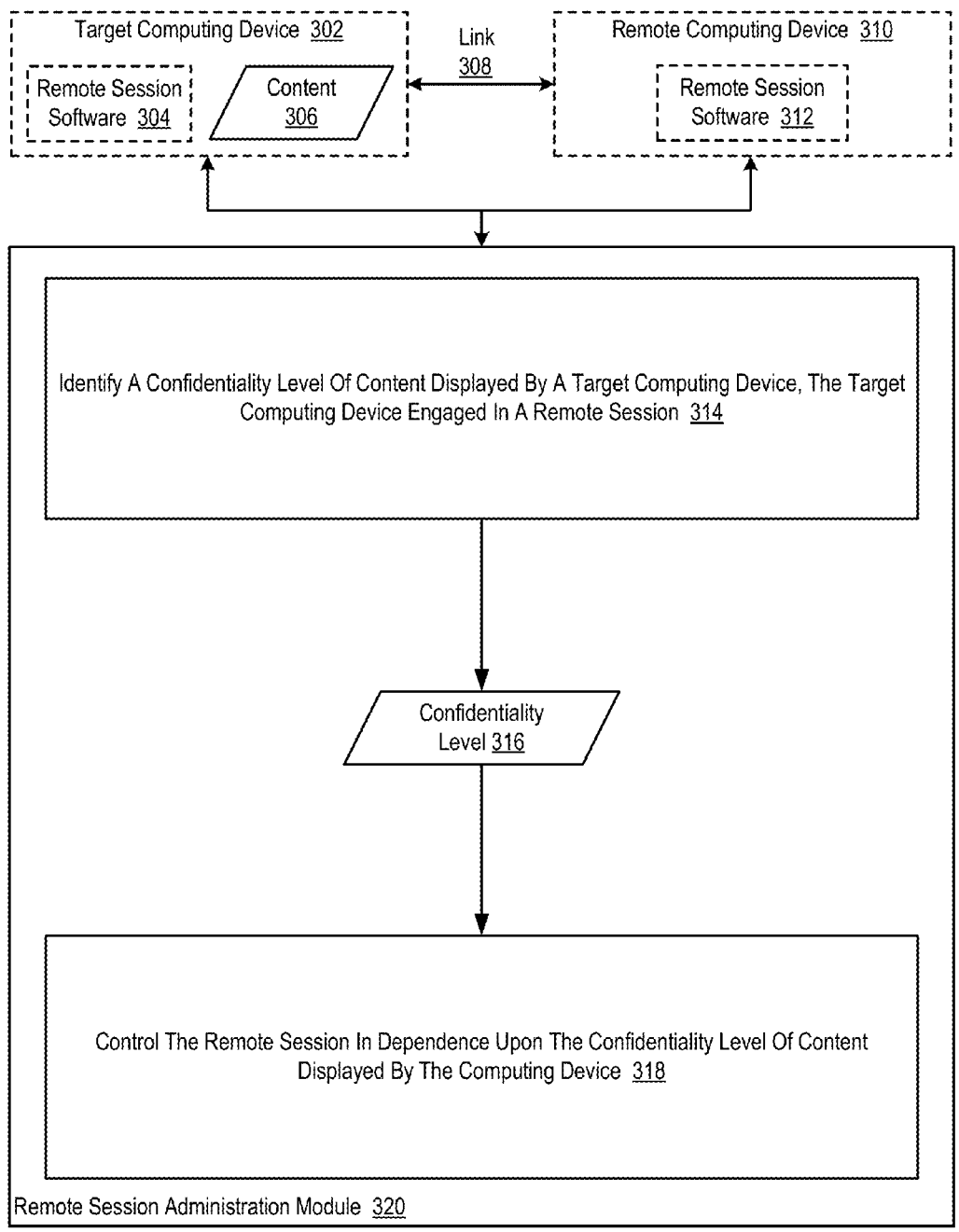
FIG. 3 sets forth a flow chart illustrating an example method for administering a remote session between a target computing device and a remote computing device according to embodiments of the present invention.

For further explanation, FIG. 3 sets forth a flow chart illustrating an example method for administering remote sessions between a target computing device and a remote computing device according to embodiments of the present invention. A remote session between a target computing device (302) and a remote compute device (310) is created when remote session software executing on the target computing device (302) enables the target computing device (302) to be controlled by a remote computing device (310). Such remote session software may be embodied, for example, as a standalone software application or as part of an operating system feature that enables to the target computing device (310) to be controlled remotely. The remote computing device (310) may control the target computing device, for example, through the use of remote session software client executing on the remote computing device (310). In such a way, a user can control the operation of the target computing device (302) even when the user is physically utilizing the remote computing device (310). In such a way, the user may administer the target computing device (302), the user may utilize software that is installed on the target computing device (302), or the user may otherwise utilize the target computing device (302) in spite of the fact that the user is not physically close to the target computing device (302).

The example method depicted in FIG. 3 is carried out by a remote session administration module (320). The remote session administration module (320) may be embodied, for example, as a module of computer program instructions executing on computer hardware such as a computer processor. The remote session administration module (320) depicted in FIG. 3 may reside, for example, on a server that is separate from the target computing device (302) and one or more remote compute devices (310) and administers remote sessions between the target computing device (302) and one or more remote compute devices (310). In such an example, the server that houses the remote session administration module (320) may communicate with the target computing device (302) and one or more remote compute devices (310) over a data communications network. In an alternative embodiment, the remote session administration module (320) may reside on the target computing device (302) itself and may administer remote sessions between the target computing device (302) and one or more remote compute devices (310).

The example method depicted in FIG. 3 includes identifying (314), by the remote session administration module (320), a confidentiality level (316) of content (306) displayed by a target computing device (302) that is engaged in a remote session with the remote computing device (310) via an active data communication link (308) between the target computing device (302) and the remote computing device (310). The content (306) displayed by the target computing device (302) may include, for example, web content displayed via a web browser, documents displayed via a word processing application, spreadsheets displayed via a spreadsheet application, and so on. Such content (306) may be 'displayed' by the target computing device (302) in the sense that the target computing device (302) generates data that may be utilized by a computer display (e.g., a computer monitor) that is operatively coupled to the target computing device (302) to generate graphical data for presentation to a user of the target computing device (302). Alternatively, such content (306) may be 'displayed' by the target computing device (302) in the sense that the target computing device (302) generates data that is transferred to the remote computing device (310) and may be utilized by the remote computing device (310) to generate graphical data for presentation to a user of the remote computing device (310) via a computer display that is operatively coupled to the remote computing device (310).

The confidentiality level (316) of content (306) displayed by a target computing device (302) represents the extent to which access to the content (306) should be restricted. Access to such content (306) should be restricted, for example, because the content (306) includes private financial information, because the content (306) includes proprietary information for a business entity, and so on. The confidentiality level (316) of content (306) displayed by a target computing device (302) may be expressed in relative terms (e.g., highly confidential, moderately confidential, not confidential) or in absolute terms such as an integer value where a value of 10 represents highly confidential information and a value of 0 represents information that is not confidential at all.

In the example method depicted in FIG. 3, identifying (314) a confidentiality level (316) of content (306) displayed by a target computing device (302) that is engaged in a remote session with the remote computing device (310) may be carried out, for example, by searching the content (306) for keywords that indicate that the content (306) is intended to be confidential. For example, content (306) that includes the term "confidential" may be identified (314) as being highly confidential. Likewise, content (306) that is displayed in a web browser whose web address begins in "https" may be identified (314) as being highly confidential by virtue of the fact that the content (306) is being displayed via a secure connection. Readers will appreciate that other characters and keywords such as "$," "top secret," "proprietary," and may others may also be indicative of confidential information. In such an example, the frequency that certain keywords appear in the content may be utilized to identify (314) a confidentiality level (316) of content (306) displayed by a target computing device (302) that is engaged in a remote session with the remote computing device (310).

The content (306) displayed by the target computing device (302) may be searched for keywords that indicate that the content (306) is intended to be confidential, for example, through the use of image processing techniques such as optical character recognition ('OCR'). In such an example, screen capture images of content (306) displayed by the target computing device (302) may be processed using OCR software to identify textual data that is included in the content (306) displayed by the target computing device (302). In an alternative embodiment, the content (306) displayed by the target computing device (302) may be searched for keywords that indicate that the content (306) is intended to be confidential by examining data that is utilized to generate the content (306). For example, the remote session administration module (320) may examine the contents of data being sent to a graphics adapter on the target computing device (302), the remote session administration module (320) may examine the contents of data being sent to a graphics adapter on the remote computing device (310), or the remote session administration module (320) may examine the contents of some other data (including metadata) that is utilized to generate the content (306) to identify textual data that is included in the content (306) displayed by the target computing device (302).

Readers will appreciate that identifying (314) a confidentiality level (316) of content (306) displayed by a target computing device (302) that is engaged in a remote session with the remote computing device (310) may be carried out in a variety of additional ways. For example, content (306) that is accessed by providing a username and password may be identified as being more confidential than content (306) that can be accessed without providing information to authenticate the user. Likewise, content (306) generated by some software applications (e.g., tax preparation software) may be identified as being more confidential that content (306) that is generated by other software applications (e.g., graphics painting software).

The example method depicted in FIG. 3 also includes controlling (318), by the remote session administration module (320), the remote session in dependence upon the confidentiality level (316) of content (306) displayed by the target computing device (302) that is engaged in a remote session with the remote computing device (310). Controlling (318) the remote session in dependence upon the confidentiality level (316) of content (306) displayed by the target computing device (302) may be carried out, for example, by limiting the amount of time that a remote session can remain open when a user of the remote computing device (310) is not utilizing the remote session. For example, when highly confidential content (306) is being displayed by the target computing device (302) but a user of the remote computing device (310) is not actively utilizing the remote session, the remote session may be terminated almost immediately. When content (306) that is not confidential is being displayed by the target computing device (302), however, the remote session may remain open indefinitely even if the user of the remote computing device (310) is not actively utilizing the remote session.

Consider an example in which the user of the remote computing device (310) initiates a remote session with the target computing device (302). In such an example, assume that the user of the remote computing device (310) accesses highly confidential information on the target computing device (302) via the remote session. In such an example, if it is determined that the user of the remote computing device (310) has not utilized the remote session for a predetermined period of time (e.g., the user has stepped away from the remote computing device), the remote session may be terminated such that another unauthorized user is not able to access the confidential information by simply walking by the remote computing device (310). In an example where the user of the remote computing device (310) is not accessing confidential information on the target computing device (302), however, the remote session may remain active even if the user of the remote computing device (310) has not utilized the remote session for the same predetermined period of time, the unauthorized user is only able to access non-confidential information by simply walking by the remote computing device (310).

Readers will appreciate that the remote session administration module (320) may control (318) the remote session in dependence upon the confidentiality level (316) of content (306) displayed by the target computing device (302) that is engaged in a remote session with the remote computing device (310) in other ways. For example, the remote session administration module (320) may restrict the manner in which other users access the target computing device (302) in dependence upon the confidentiality level (316) of content (306) displayed by the target computing device (302) that is engaged in a remote session with the remote computing device (310). The remote session administration module (320) may also perform certain functions (e.g., closing out of a software application on the target computing device, restarting the target computing device) when a remote session is terminated in dependence upon the confidentiality level (316) of content (306) displayed by the target computing device (302) that is engaged in a remote session with the remote computing device (310).

Figure 4:
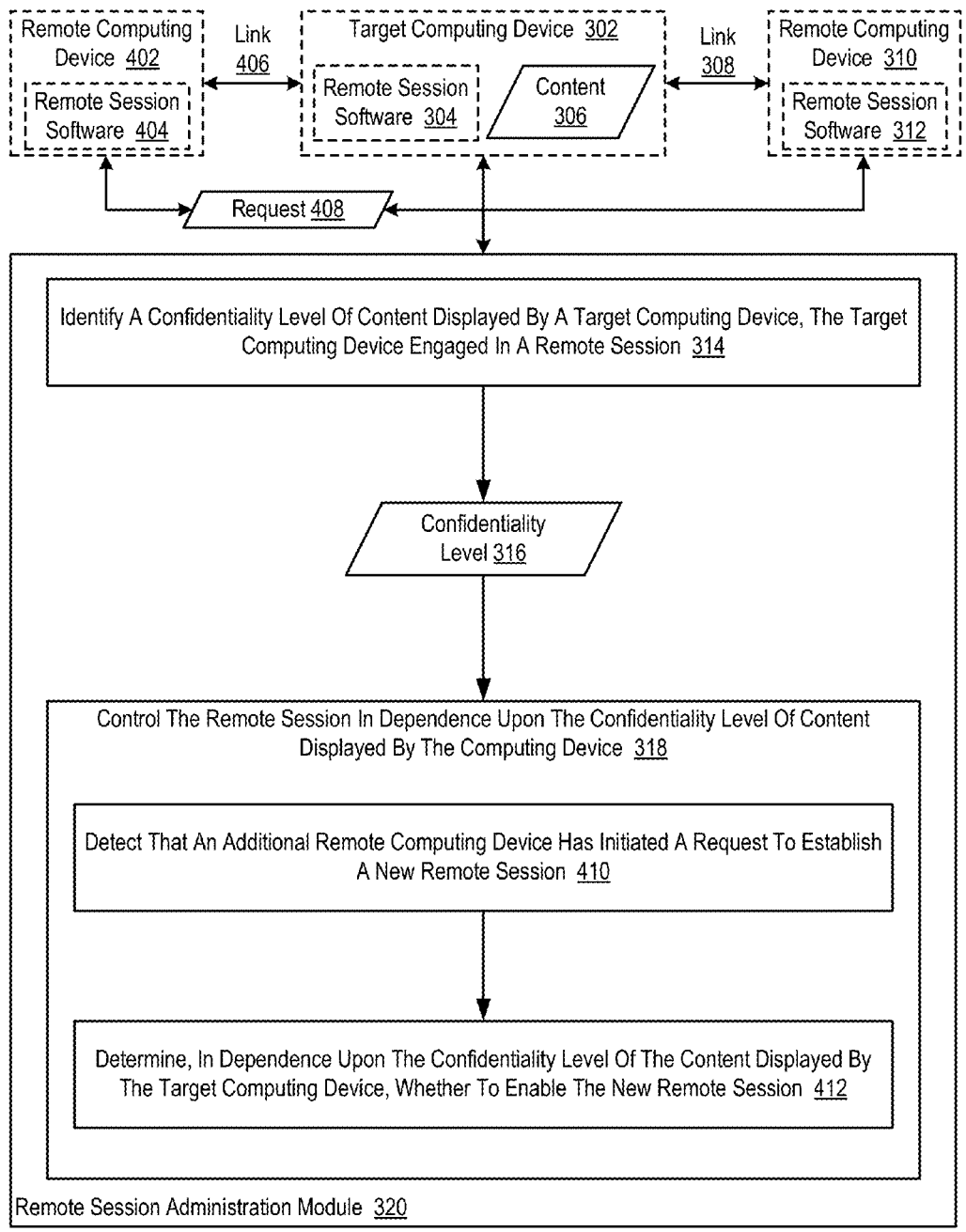
FIG. 4 sets forth a flow chart illustrating an additional example method for administering a remote session between a target computing device and a remote computing device according to embodiments of the present invention.

For further explanation, FIG. 4 sets forth a flow chart illustrating a further example method for administering remote sessions between a target computing device and a remote computing device according to embodiments of the present invention. The example method depicted in FIG. 4 is similar to the example method depicted in FIG. 3, as the example method depicted in FIG. 4 also includes identifying (314) a confidentiality level (316) of content (306) displayed by a target computing device (302) that is engaged in a remote session with the remote computing device (310) and controlling (318) the remote session in dependence upon the confidentiality level (316) of content (306) displayed by the target computing device (302) that is engaged in a remote session with the remote computing device (310).

In the example method depicted in FIG. 4, controlling (318) the remote session in dependence upon the confidentiality level (316) of content (306) displayed by the target computing device (302) can include detecting (410), by the remote session administration module (320), that an additional remote computing device (402) has initiated a request (408) to establish a new remote session with that target computing device (302). In the example method depicted in FIG. 4, the request (408) to establish a new remote session may be generated by remote session software (404) executing on the additional remote computing device (402). The request (408) to establish a new remote session may include, for example, an identification of the additional remote computing device (402), an identification of a user that is attempting to initiate a remote session at the additional remote computing device (402), credentials of such a user, and so on. In such a way, the additional remote computing device (402) may request (408) the establishment of a new remote session that includes a data communications link (406) between the additional remote computing device (402) and the target computing device (302).

In the example method depicted in FIG. 4, controlling (318) the remote session in dependence upon the confidentiality level (316) of content (306) displayed by the target computing device (302) that is engaged in a remote session with the remote computing device (310) can also include determining (412), by the remote session administration module (320) in dependence upon the confidentiality level (316) of content (306) displayed, whether to enable the new remote session. Enabling the new remote session may be carried out, for example, by remote session software executing on the target computing device (302) enabling the target computing device (302) to be controlled by the additional remote computing device (402) via a data communications link (406) between the additional remote computing device (402) and the target computing device (302). In such an example, the remote session software executing on the target computing device (302) may also disable the ability of a remote computing device (310) that was previously engaged in a remote session with the target computing device (302) to control the target computing device (302), such that the additional remote computing device (402) is the only remote computing device that is enabled to control the target computing device (302).

Determining (412) whether to enable the new remote session in dependence upon the confidentiality level (316) of content (306) displayed by the target computing device (302) may be carried out, for example, by only enabling the new remote session when the confidentiality level (316) of content (306) displayed by the target computing device (302) is below a predetermined threshold, such that the new remote session is only enabled when the target computing device (302) is displaying content that has not been determined to be confidential in nature. In a situation where the target computing device (302) is displaying content that is confidential in nature, the remote session administration module (320) may block the establishment of the new remote session between the additional remote computing device (402) and the target computing device (302) until the target computing device (302) has ceased displaying the content that is confidential in nature, such that the user of the additional remote computing device (402) is not able to access the content that has been determined to be confidential in nature.

Figure 5:
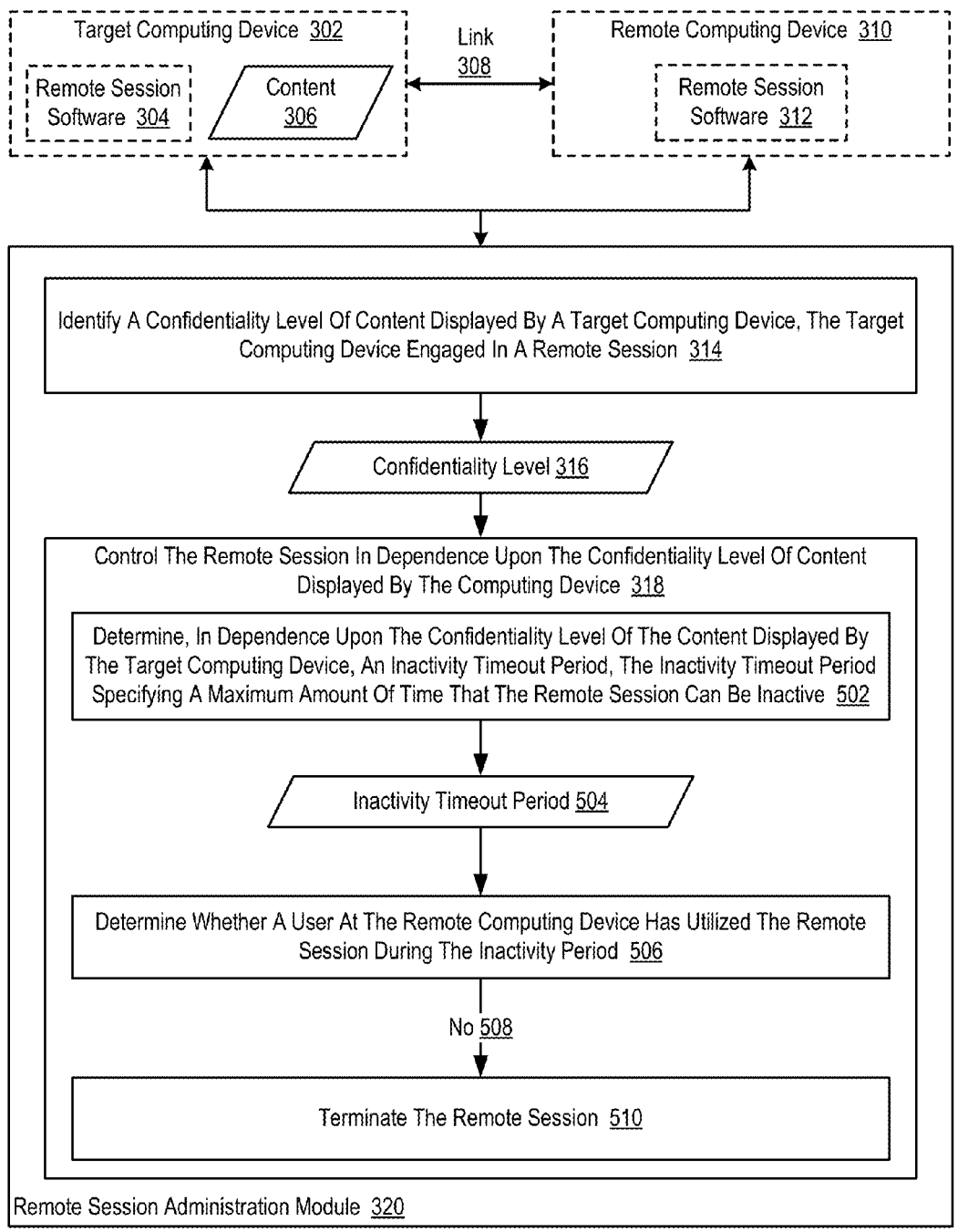
FIG. 5 sets forth a flow chart illustrating an additional example method for administering a remote session between a target computing device and a remote computing device according to embodiments of the present invention.

For further explanation, FIG. 5 sets forth a flow chart illustrating a further example method for administering remote sessions between a target computing device and a remote computing device according to embodiments of the present invention. The example method depicted in FIG. 5 is similar to the example method depicted in FIG. 3, as the example method depicted in FIG. 5 also includes identifying (314) a confidentiality level (316) of content (306) displayed by a target computing device (302) and controlling (318) the remote session in dependence upon the confidentiality level (316) of content (306) displayed by the target computing device (302) that is engaged in a remote session with the remote computing device (310).

In the example method depicted in FIG. 5, controlling (318) the remote session in dependence upon the confidentiality level (316) of content (306) displayed by the target computing device (302) can include determining (502), by the remote session administration module (320) in dependence upon the confidentiality level (316) of the content displayed by the target computing device (302), an inactivity timeout period (504). The inactivity timeout period (504) depicted in FIG. 5 can specify a maximum amount of time that the remote session between the target computing device (302) and the remote computing device (310) can be unutilized by a user of the remote computing device (310). A session is considered to be unutilized when a user of the remote computing device (310) is no longer actively using resources on the target computing device (302). The remote session administration module (320) may determine that the user of the remote computing device (310) is no longer actively using resources on the target computing device (302), for example, by detecting that the user of the remote computing device (310) has not opened, modified, or otherwise accessed any resources on the target computing device (302) within the inactivity timeout period (504). The remote session administration module (320) may detect that the user of the remote computing device (310) has not opened, modified, or otherwise accessed any resources on the target computing device (302) within the inactivity timeout period (504) by determining that the user has not made a keystroke, moved a mouse pointer, or carried out any other action on the target computing device (302) via the remote session between the target computing device (302) and the remote computing device (310).

In the example method depicted in FIG. 5, controlling (318) the remote session in dependence upon the confidentiality level (316) of content (306) displayed by the target computing device (302) can also include determining (506), by the remote session administration module (320), whether a user at the remote computing device (310) has utilized the remote session during the inactivity timeout period (504). Determining (506) whether a user at the remote computing device (310) has utilized the remote session during the inactivity timeout period (504) may be carried out, for example, by determining whether the user at the remote computing device (310) has accessed a file contained on the remote computing device (310), determining whether the user at the remote computing device (310) has utilized software that resides on the remote computing device (310), and so on. In such a way, the remote session administration module (320) may determine whether the remote session is being actively utilized by the user at the remote computing device (310) or, alternatively, whether the remote session is stale in the sense that the remote session was not being actively utilized by the user at the remote computing device (310) during the immediately preceding inactivity timeout period (504).

In the example method depicted in FIG. 5, controlling (318) the remote session in dependence upon the confidentiality level (316) of content (306) displayed by the target computing device (302) can also include terminating (510), by the remote session administration module (320), the remote session in response to determining that the user at the remote computing device (310) has not utilized the remote session during the inactivity timeout period (504). Terminating (510) the remote session in response to determining that the user at the remote computing device (310) has not utilized the remote session during the inactivity timeout period (504) may be carried out, for example, by terminating a data communications link between the remote computing device (310) and the target computing device (302), by sending a session termination message to the remote computing device (310), and so on. In such a way, the remote session administration module (320) may terminate a remote session that is not being actively utilized by the user at the remote computing device (310) when relatively confidential content (306) is being displayed by the target computing device (302), thereby reducing the likelihood that an unauthorized party will access the content (306) that is relatively confidential and also not actively being utilized or otherwise accessed by the user at the remote computing device (310).

Figure 6:
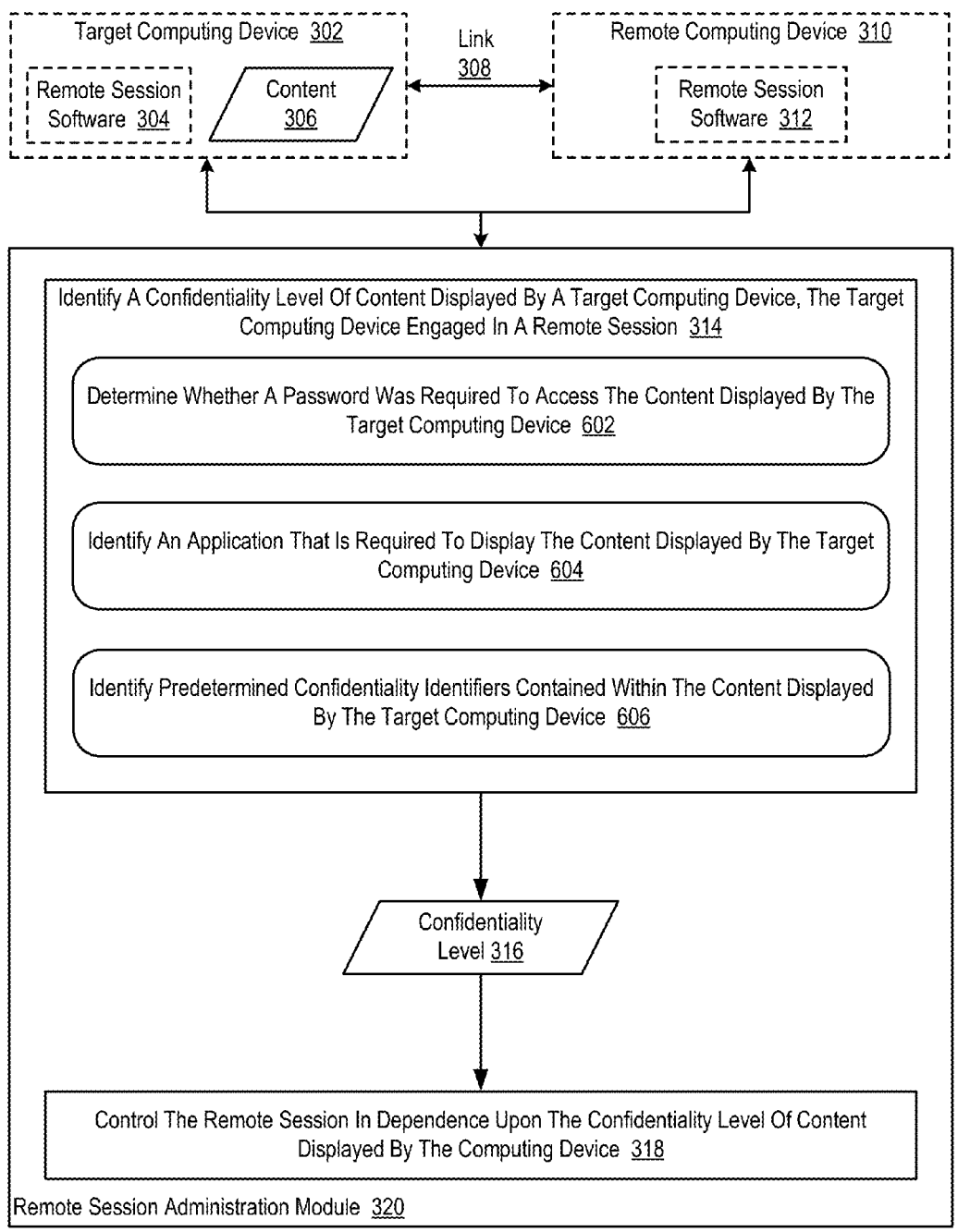
FIG. 6 sets forth a flow chart illustrating a further example method for administering remote sessions between a target computing device and a remote computing device according to embodiments of the present invention.

For further explanation, FIG. 6 sets forth a flow chart illustrating a further example method for administering remote sessions between a target computing device and a remote computing device according to embodiments of the present invention. The example method depicted in FIG. 6 is similar to the example method depicted in FIG. 3, as the example method depicted in FIG. 6 also includes identifying (314) a confidentiality level (316) of content (306) displayed by a target computing device (302) and controlling (318) the remote session in dependence upon the confidentiality level (316) of content (306) displayed by the target computing device (302) that is engaged in a remote session with the remote computing device (310).

In the example method depicted in FIG. 6, identifying (314) a confidentiality level (316) of content (306) displayed by a target computing device (302) can include determining (602), by the remote session administration module (320), whether a password was required to access the content (306) displayed by the target computing device (302). The remote session administration module (320) may determine (602) whether a password was required to access the content (306) displayed by the target computing device (302), for example, through the use of image processing techniques such as OCR. In such an example, screen capture images of content (306) displayed by the target computing device (302) may be processed using OCR software to determine whether a dialogue box or other data entry form was displayed that includes labels such as "username," "password," or other textual data indicating that a password was required to access the content (306) displayed by the target computing device (302). In an alternative embodiment, the remote session administration module (320) may examine the contents of data being sent to a graphics adapter on the remote computing device (310), or the remote session administration module (320) may examine the contents of some other data (including metadata) that is utilized to generate the content (306) to identify that a dialogue box or other data entry form was generated that includes labels such as "username," "password," or other textual data indicating that a password was required to access the content (306) displayed by the target computing device (302).

In the example method depicted in FIG. 6, identifying (314) a confidentiality level (316) of content (306) displayed by a target computing device (302) can alternatively include identifying (604) an application that is required to display the content (306) displayed by the target computing device (302). In the example method depicted in FIG. 6, the nature of the application that is used to display the content (306) may be used to determine the extent to which the content is confidential. For example, applications such as a tax preparation application, an accounting application, an application for accessing a bank account, an application for managing internal documents for a business organization, and other applications may be determined to be applications that are prone to display confidential information. As such, when applications that have been identified as being prone to display confidential information are being utilized, the remote session administration module (320) may determine that the confidentiality level (316) of content (306) displayed by the target computing device (302) is relatively high. Alternatively, when applications that have not been identified as being prone to display confidential information are being utilized, the remote session administration module (320) may determine that the confidentiality level (316) of content (306) displayed by the target computing device (302) is relatively low.

Identifying (604) an application that is required to display the content (306) displayed by the target computing device (302) may be carried out, for example, through the use of image processing techniques such as OCR. In such an example, screen capture images of content (306) displayed by the target computing device (302) may be processed using OCR software to determine the name of an application that is required to display the content (306) displayed by the target computing device (302). For example, a window that is displaying the content (306) may be searched for phrases such as "TurboTax," "Microsoft Word," "Mozilla Firefox," or other labels that can be used to identify an application that is displaying content. Likewise, tool bars or other graphical elements that display the names of currently executing applications could be processed to identify labels that can be used to identify an application that is displaying content. In an alternative embodiment, the remote session administration module (320) may examine the contents of data being sent to a graphics adapter on the remote computing device (310), or the remote session administration module (320) may examine the contents of some other data (including metadata) that is utilized to generate the content (306) to identify an application that is displaying content. In such a way, each known application may be associated with a predetermined confidentiality level, such that the confidentiality level (316) of content (306) displayed by such an application can be identified (604).

In the example method depicted in FIG. 6, identifying (314) a confidentiality level (316) of content (306) displayed by a target computing device (302) can alternatively include identifying (606), by the remote session administration module (320), predetermined confidentiality identifiers contained within the content (306) displayed by the target computing device (302). Predetermined confidentiality identifiers may include, for example, textual characters that are commonly included in confidential information. Such predetermined confidentiality identifiers can include, for example, a dollar sign ('$') that would be common text to be included when displaying confidential financial information, the text string "https" which is displayed as part of an address for a secure web page, the text string "confidential" which is displayed in the content (306) itself, and so on.

Identifying (606) predetermined confidentiality identifiers contained within the content (306) displayed by the target computing device (302) may be carried out, for example, through the use of image processing techniques such as OCR. In such an example, screen capture images of content (306) displayed by the target computing device (302) may be processed using OCR software to search the content (306) for the predetermined confidentiality identifiers. In an alternative embodiment, the remote session administration module (320) may examine the contents of data being sent to a graphics adapter on the remote computing device (310), or the remote session administration module (320) may examine the contents of some other data (including metadata) that is utilized to generate the content (306) to identify predetermined confidentiality identifiers contained within the data that is used to generate the content (306) displayed by the target computing device (302).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering a remote session between a target computing device and a remote computing device, the method comprising:
   identifying, by a remote session administration module, a confidentiality level of content displayed by the target computing device, the target computing device engaged in a remote session with the remote computing device, the remote session carried out by software executed by the target computing device, software executed by the remote computing device, and an active data communication link between the target computing device and the remote computing device; and
   controlling, by the remote session administration module, the remote session in dependence upon the confidentiality level of content displayed by the target computing device; and
   determining, by the remote session administration module in dependence upon the confidentiality level of the content displayed by the target computing device, an inactivity timeout period, the inactivity timeout period specifying a maximum amount of time that the remote session can be unutilized by a user of the remote computing device.

2. The method of claim 1 wherein controlling the remote session in dependence upon the confidentiality level of content displayed by the target computing device further comprises:
   detecting, by the remote session administration module, that an additional remote computing device has initiated a request to establish a new remote session with the target computing device; and
   determining, by the remote session administration module in dependence upon the confidentiality level of the content displayed by the target computing device, whether to enable the new remote session.

3. The method of claim 1 wherein controlling the remote session in dependence upon the confidentiality level of content displayed by the target computing device further comprises:
- determining, by the remote session administration module, whether a user at the remote computing device has utilized the remote session during the inactivity timeout period; and
- responsive to determining that the user at the remote computing device has not utilized the remote session during the inactivity timeout period, terminating, by the remote session administration module, the remote session.

4. The method of claim 1 wherein identifying the confidentiality level of content displayed by the target computing device further comprises determining, by the remote session administration module, whether a password was required to access the content displayed by the target computing device.

5. The method of claim 1 wherein identifying the confidentiality level of content displayed by the target computing device further comprises identifying an application that is required to display the content displayed by the target computing device.

6. The method of claim 1 wherein identifying the confidentiality level of content displayed by the target computing device further comprises identifying, by the remote session administration module, predetermined confidentiality identifiers contained within the content displayed by the target computing device.

7. An apparatus for administering a remote session between a target computing device and a remote computing device, the apparatus comprising a computer processor, a computer memory operatively coupled to the computer processor, the computer memory having disposed within it computer program instructions that, when executed by the computer processor, cause the apparatus to carry out the steps of:
- identifying, by a remote session administration module, a confidentiality level of content displayed by the target computing device, the target computing device engaged in a remote session with the remote computing device, the remote session carried out by software executed by the target computing device, software executed by the remote computing device, and an active data communication link between the target computing device and the remote computing device; and
- controlling, by the remote session administration module, the remote session in dependence upon the confidentiality level of content displayed by the target computing device; and
- determining, by the remote session administration module in dependence upon the confidentiality level of the content displayed by the target computing device, an inactivity timeout period, the inactivity timeout period specifying a maximum amount of time that the remote session can be inactive.

8. The apparatus of claim 7 wherein controlling the remote session in dependence upon the confidentiality level of content displayed by the target computing device further comprises:
- detecting, by the remote session administration module, that an additional remote computing device has initiated a request to establish a new remote session with the target computing device; and
- determining, by the remote session administration module in dependence upon the confidentiality level of the content displayed by the target computing device, whether to enable the new remote session.

9. The apparatus of claim 7 wherein controlling the remote session in dependence upon the confidentiality level of content displayed by the target computing device further comprises:
- determining, by the remote session administration module, whether a user at the remote computing device has utilized the remote session during the inactivity timeout period; and
- responsive to determining that the user at the remote computing device has not utilized the remote session during the inactivity timeout period, terminating, by the remote session administration module, the remote session.

10. The apparatus of claim 7 wherein identifying the confidentiality level of content displayed by the target computing device further comprises determining, by the remote session administration module, whether a password was required to access the content displayed by the target computing device.

11. The apparatus of claim 7 wherein identifying the confidentiality level of content displayed by the target computing device further comprises identifying an application that is required to display the content displayed by the target computing device.

12. The apparatus of claim 7 wherein identifying the confidentiality level of content displayed by the target computing device further comprises identifying, by the remote session administration module, predetermined confidentiality identifiers contained within the content displayed by the target computing device.

13. A computer program product for administering a remote session between a target computing device and a remote computing device, the computer program product disposed upon a computer readable medium, the computer program product comprising computer program instructions that, when executed, cause a computer to carry out the steps of:
- identifying, by a remote session administration module, a confidentiality level of content displayed by the target computing device, the target computing device engaged in a remote session with the remote computing device, the remote session carried out by software executed by the target computing device, software executed by the remote computing device, and an active data communication link between the target computing device and the remote computing device; and
- controlling, by the remote session administration module, the remote session in dependence upon the confidentiality level of content displayed by the target computing device; and
- determining, by the remote session administration module in dependence upon the confidentiality level of the content displayed by the target computing device, an inactivity timeout period, the inactivity timeout period specifying a maximum amount of time that the remote session can be inactive.

14. The computer program product of claim 13 wherein controlling the remote session in dependence upon the confidentiality level of content displayed by the target computing device further comprises:
- detecting, by the remote session administration module, that an additional remote computing device has initiated a request to establish a new remote session with the target computing device; and determining, by the remote session administration module in dependence upon the confidentiality level of the content displayed by the target computing device, whether to enable the new remote session.

15. The computer program product of claim 13 wherein controlling the remote session in dependence upon the confidentiality level of content displayed by the target computing device further comprises:

determining, by the remote session administration module, whether a user at the remote computing device has utilized the remote session during the inactivity timeout period; and responsive to determining that the user at the remote computing device has not utilized the remote session during the inactivity timeout period, terminating, by the remote session administration module, the remote session.

16. The computer program product of claim 13 wherein identifying the confidentiality level of content displayed by the target computing device further comprises determining, by the remote session administration module, whether a password was required to access the content displayed by the target computing device.

17. The computer program product of claim 13 wherein identifying the confidentiality level of content displayed by the target computing device further comprises identifying an application that is required to display the content displayed by the target computing device.

18. The computer program product of claim 13 wherein identifying the confidentiality level of content displayed by the target computing device further comprises identifying, by the remote session administration module, predetermined confidentiality identifiers contained within the content displayed by the target computing device.

* * * * *